US011188893B2

(12) United States Patent
Maddocks et al.

(10) Patent No.: US 11,188,893 B2
(45) Date of Patent: Nov. 30, 2021

(54) ACCESS CONTROL BYPASS ON MOBILE FOR MASS TRANSIT

(71) Applicant: MasterCard International Incorporated, Purchase, NY (US)

(72) Inventors: Ian David Alan Maddocks, Milton Keynes (GB); Simon Phillips, York (GB); Duncan Garrett, London (GB); James John Anderson, Brooklyn, NY (US)

(73) Assignee: Mastercard International Incorporated, Purchase, NY (US)

( * ) Notice: Subject to any disclaimer, the term of this patent is extended or adjusted under 35 U.S.C. 154(b) by 1313 days.

(21) Appl. No.: 15/334,735

(22) Filed: Oct. 26, 2016

(65) Prior Publication Data

US 2017/0206521 A1 Jul. 20, 2017

Related U.S. Application Data

(60) Provisional application No. 62/279,048, filed on Jan. 15, 2016, provisional application No. 62/306,825, (Continued)

(51) Int. Cl.
*G06Q 20/40* (2012.01)
*G06Q 30/02* (2012.01)
(Continued)

(52) U.S. Cl.
CPC ....... *G06Q 20/3278* (2013.01); *G06Q 20/102* (2013.01); *G06Q 20/3224* (2013.01);
(Continued)

(58) Field of Classification Search
CPC ................. G06Q 20/00–425; H04W 4/00–90
See application file for complete search history.

(56) References Cited

U.S. PATENT DOCUMENTS

| 7,717,346 | B2* | 5/2010 | Smets ............... | G01R 31/302 |
| | | | | 235/380 |
| 2008/0156873 | A1* | 7/2008 | Wilhelm ............ | G07B 15/00 |
| | | | | 235/384 |
| 2014/0209673 | A1* | 7/2014 | Phillips ............. | G06Q 20/045 |
| | | | | 235/384 |

FOREIGN PATENT DOCUMENTS

| CN | 101692277 A | 4/2010 |
| CN | 103477358 A | 12/2013 |

(Continued)

OTHER PUBLICATIONS

ISO/IEC 14443-3, Identification cards—Contactless integrated circuit(s) cards—Proximity cards—Part 3 Initialization and anticollision, First edition, Feb. 1, 2001(Year: 2001).*

(Continued)

*Primary Examiner* — John W Hayes
*Assistant Examiner* — Chenyuh Kuo
(74) *Attorney, Agent, or Firm* — Buckley, Maschoff & Talwalkar LLC (57) ABSTRACT

A method of operating a payment-enabled mobile device includes detecting, by the mobile device, that the mobile device is in proximity to a non-retail contactless transaction terminal. The method further includes permitting operation of an application program in the mobile device. The permitting of operation of the application program is in response to the detected proximity of the non-retail contactless transaction terminal. The operation of the application program is to engage in a transaction with the non-retail contactless transaction terminal while bypassing a user verification feature of the application program.

7 Claims, 6 Drawing Sheets

Related U.S. Application Data filed on Mar. 11, 2016, provisional application No. 62/322,319, filed on Apr. 14, 2016, provisional application No. 62/337,954, filed on May 18, 2016.

(51) Int. Cl.
| | | |
|---|---|---|
| *G06Q 20/32* | (2012.01) | |
| *G06Q 20/34* | (2012.01) | |
| *G06Q 20/38* | (2012.01) | |
| *H04W 4/80* | (2018.01) | |
| *G06Q 20/10* | (2012.01) | |

(52) U.S. Cl.
CPC ....... *G06Q 20/405* (2013.01); *G06Q 20/4012* (2013.01); *H04W 4/80* (2018.02)

(56) References Cited

FOREIGN PATENT DOCUMENTS

| | | |
|---|---|---|
| JP | 2003125043 A | 4/2003 |
| JP | 2007274267 A | 10/2007 |
| JP | 2013250987 A | 12/2013 |
| WO | 2017123382 A1 | 7/2017 |

OTHER PUBLICATIONS

EMV Integrated Circuit Card Specification for Payment Systems Book 3 Application Specification Version 4.3, Nov. 2011 (Year: 2011).*
EMV Contactless Specification for Payment Systems Book D EMV Contactless Communication Protocol Specification Version 2.5, Mar. 2015 (Year: 2015).*
"PCT Notification of Transmittal of the International Search Report and the Written Opinion", of the International Searching Authority, or the Declaration, dated Jun. 6, 2017 (Jun. 6, 2017), for International Application No. PCT/US2016/067240, 12pgs.
"Canadian Office Action", dated Jun. 25, 2019 (Jun. 25, 2019), Canadian Intellectual Property Office, for Canadian Application No. 3,011,426, 4pgs.
Communication pursuant to Article 94(3) EPC: European Office Action, dated Oct. 17, 2019 (Oct. 17, 2019), European Patent Office, for European Patent Application No. 16843246.6-1217, 7 pp.
Japanese Office Action dated Jul. 30, 2019 which has been issued in connection with JP2019-505917 which was filed on Dec. 16, 2016.
"Canadian Office Action", dated Apr. 27, 2020 (Apr. 27, 2020), Canadian Intellectual Property Office, for Canadian Application No. 3,011,426, 4pgs.
"Japanese Office Action" dated Mar. 3, 2020, Japanese Patent Office (JPO), for Japanese Application No. 2018-536804, 3pgs.
"English-language Translation of Japanese Office Action" dated Mar. 3, 2020, Japanese Patent Office (JPO), for Japanese Application No. 2018-536804, 3pgs.

* cited by examiner

ACCESS CONTROL BYPASS ON MOBILE FOR MASS TRANSIT

CROSS REFERENCE TO RELATED APPLICATIONS

This application claims the benefit of U.S. Provisional Patent Application Nos. 62/279,048 (filed on Jan. 15, 2016); 62/306,825 (filed on Mar. 11, 2016); 62/322,319 (filed on Apr. 14, 2016); and 62/337,954 (filed on May 18, 2016), the contents of which provisional applications are hereby incorporated by reference for all purposes.

BACKGROUND

Payment cards such as credit or debit cards are ubiquitous and for decades such cards have included a magnetic stripe on which the relevant account number is stored. Traditionally, to consummate a purchase transaction with such a card, the card is swiped through a magnetic stripe reader that is part of the point of sale (POS) terminal. The reader reads the account number from the magnetic stripe. The account number is then used to route a transaction authorization request that is initiated by the POS terminal.

In subsequent developments, smart cards (IC cards) have been developed and deployed as payment cards. In various configurations, the IC payment cards engage in communications with a POS terminal either "contactlessly" (i.e., via short-range radio communication) or via direct electrical contacts engaged with matching contacts on the POS reader.

Still more recently, systems have been deployed in which mobile devices such as smartphones have been equipped and programmed so as to emulate the functionality of contactless payment IC cards. One or more payment application programs (apps) are loaded in the payment-enabled mobile devices to engage in contactless transactions with POS readers. A short-range radio communication capability (e.g., NFC) is also built in to the payment-enabled mobile device and is utilized by the payment app in conducting contactless transactions. A payment account number or payment token is provisioned to the payment app for transmission to the POS terminal during a contactless transaction to identify or point to the payment account to be used for the transaction.

For purposes of enhanced transaction security, payment-enabled mobile devices have been equipped with user verification functionality to control the user's access to the payment app. The user verification functionality, in some payment-enabled mobile devices, includes a fingerprint sensor. The user may be required to present his or her finger-tip to the sensor to verify himself/herself, to open the payment app, and to approve a payment transaction with a single gesture. In this way, for payment transactions, biometric-based security and a high degree of convenience may be combined in a payment-enabled mobile device.

In other types of payment-enabled mobile devices, the user may enter a PIN or password to verify himself/herself in order to gain access to the payment app for enabling a payment transaction.

Dedicated contactless IC cards or general-purpose contactless payment IC cards are also in use to allow the holders thereof to gain entrance to mass transit systems. In these applications, the dedicated or general purpose contactless card may very rapidly identify the holder to a transit system terminal that controls an entry gate for the transit system.

Payment-enabled mobile devices may also emulate contactless cards in permitting the user of the device to gain entrance to the transit system via radio communications between the payment app on the mobile device and the transit system terminal. However, it is desirable that the interaction between the card or mobile device—on the one hand—and the transit terminal on the other, should be quite rapid so as to allow a smooth flow of users through the entry gate. With at least some current examples of payment apps in mobile devices, the user verification required for accessing the payment app may result in delay and inconvenience in bringing about communication between the payment app and the transit terminal. Consequently, there may be a decrease in usability of at least some payment-enabled mobile devices for gaining entrance to mass transit systems.

BRIEF DESCRIPTION OF THE DRAWINGS

Features and advantages of some embodiments of the present disclosure, and the manner in which the same are accomplished, will become more readily apparent upon consideration of the following detailed description of the invention taken in conjunction with the accompanying drawings, which illustrate preferred and example embodiments and which are not necessarily drawn to scale, wherein.

DESCRIPTION

In general, and for the purpose of introducing concepts of embodiments of the present disclosure, a payment-enabled mobile device may detect that it is near a transit system terminal (which controls an entry gate to a mass transit system). As a result of detecting the nearness of the transit system terminal, a payment app in the mobile device may be placed in a mode of operation in which user verification features of the app are bypassed and the payment app is made immediately available for communication with the transit system terminal without a requirement for user verification. The payment-enabled mobile device's detection of the transit system terminal may be based on detecting a sequence of polling signals transmitted by the transit system terminal and specific to transit system terminals By bypassing the user verification feature of the payment app, a very rapid and convenient interaction between the payment-enabled mobile device and the transit system terminal may occur, to permit swift entrance of the mobile device user through the entry gate to the mass transit system.

Figure 1:
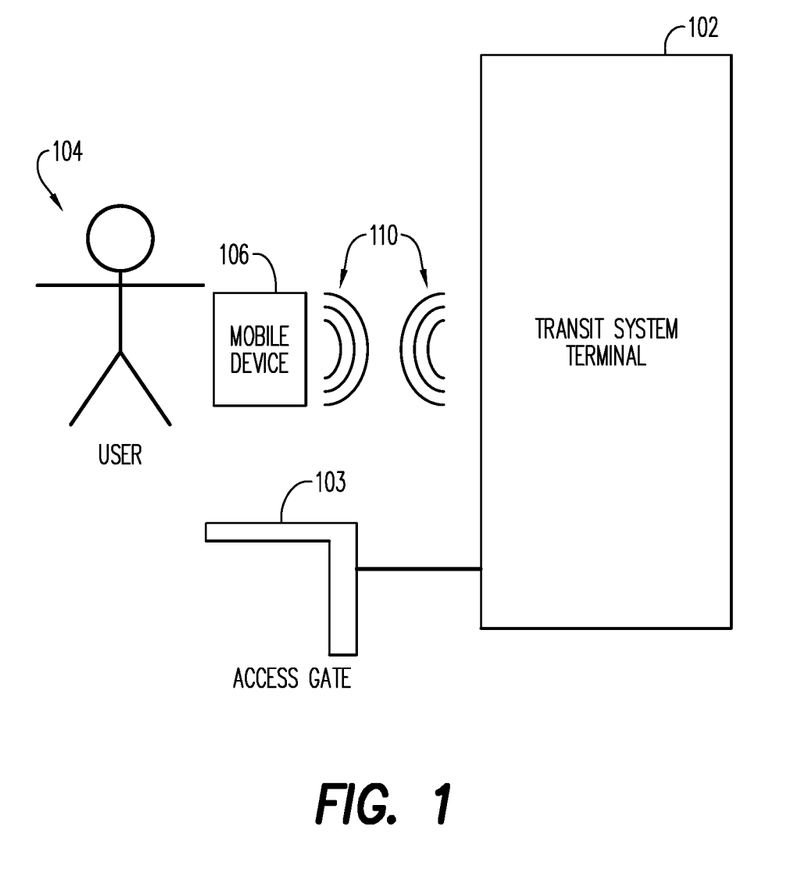
FIG. 1 is a diagram that schematically illustrates a mass transit system entrance transaction in connection with which aspects of the present disclosure may be applied.

Reference is now made to FIG. 1 which is a schematic illustration of an example embodiment. More specifically, FIG. 1 is a diagram that schematically illustrates a mass transit system entrance transaction in connection with which aspects of the present disclosure may be applied.

In FIG. 1, a transit system terminal 102 is shown. The transit system terminal 102 may alternatively be referred to as a "transit system transaction terminal" or "transit system contactless transaction terminal" in the sense that the terminal 102 may engage in "transactions" with devices such as contactless IC cards, payment-enabled mobile devices, etc. The term "transaction" should be understood to refer to any exchange of data between the transit system terminal 102 and another device in which the other device identifies the holder of the device and/or indicates that the holder is entitled to enter the transit system and/or arrangements are made for payment to obtain the holder's entrance into the payment system. An entry gate 103 (also referred to as an "access gate") to the transit system is operatively coupled to the transit system terminal 102 and is under control of the transit system terminal 102. In some embodiments, the transit system terminal 102 may be physically integrated with the entry gate 103.

Also shown in FIG. 1 is an individual user 104 who is carrying a payment-enabled mobile device 106. An exchange of short-range radio communications between the payment-enabled mobile device 106 and the transit system terminal 102 is schematically illustrated at 110.

Further aspects of operation of the transit system terminal 102 will be described below in connection with its interactions with or effects upon the mobile device 106. In some embodiments, operation of the transit system terminal 102 may resemble operation of a typical transit system terminal. However, in other embodiments, and in accordance with aspects of the present disclosure, the sequence of polling signals transmitted by the transit system terminal may be different from polling signal sequences prescribed by standards related to interactions between PCDs (proximity coupling devices) and PICCs (proximity integrated circuit cards). (It will be understood that in connection with transit entry applications, mobile devices may be programmed with a suitable app to emulate PICCs.) The different-from-current-standards polling signal sequence exhibited by the transit system terminal according to the latter embodiments may aid the mobile device 106 in detecting that it is near a transit system terminal rather than another type of PCD.

A wireless, short range exchange of signals between the mobile device 106 and the transit system terminal 102 is schematically indicated at 110 in FIG. 1.

Figure 2:
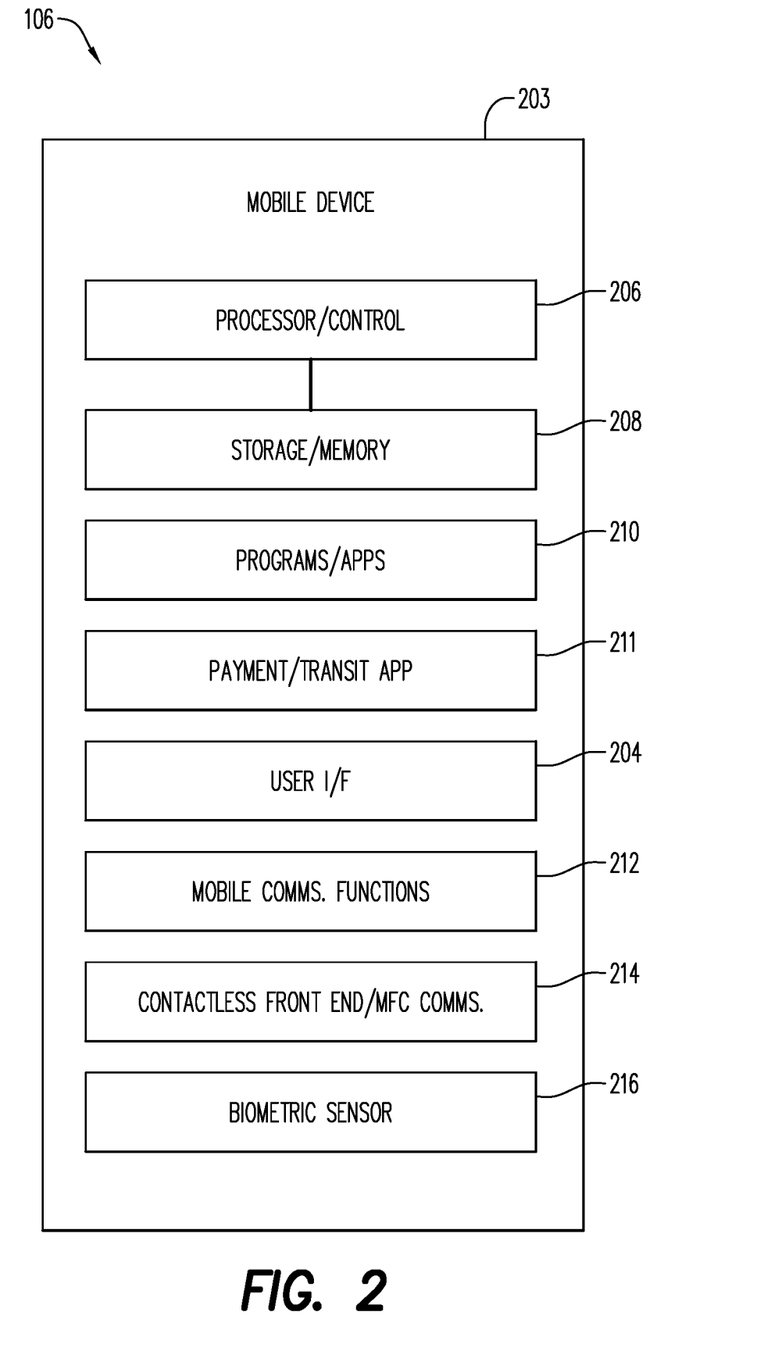
FIG. 2 is block diagram of a payment-enabled mobile device shown in FIG. 1 and provided in accordance with teachings of this disclosure.

Further details of the payment-enabled mobile device 106 will also be provided, including initially a discussion thereof in connection with FIG. 2, to which reference is now made. FIG. 2 is a block diagram of an example embodiment of the payment-enabled mobile device 106 shown in FIG. 1; the payment-enabled mobile device is provided in accordance with teachings of this disclosure.

The mobile device 106 may include a housing 203. In many embodiments, the front of the housing 203 is predominantly constituted by a touchscreen (not separately shown), which is a key element of the user interface 204 of the mobile device 106.

The mobile device 106 further includes a mobile processor/control circuit 206, which is contained within the housing 203. Also included in the mobile device 106 is a storage/memory device or devices (reference numeral 208). The storage/memory devices 208 are in communication with the processor/control circuit 206 and may contain program instructions to control the processor/control circuit 206 to manage and perform various functions of the mobile device 106. As is well-known, a device such as mobile device 106 may function as what is in effect a pocket-sized personal computer (assuming for example that the mobile device is a smartphone), via programming with a number of application programs, or "apps", as well as a mobile operating system (OS). (The apps are represented at block 210 in FIG. 2, and may, along with other programs, in practice be stored in block 208, to program the processor/control circuit 206.)

Also shown in FIG. 2 is a payment/transit app 211. The payment/transit app 211 is shown apart from the other apps represented at block 210, in part due to the particular relevance of the payment/transit app 211 to the subject of this disclosure. In addition, the separate representation of the payment/transit app 211 also may be considered to represent the possibility that it is stored in a secured element (SE—not shown apart from block 211 or block 208), which may be provided in some embodiments of the payment-enabled mobile device 106 to provide enhanced security for the payment/transit app 211 and/or sensitive data associated therewith. The SE, if present, may be conventional in its hardware aspects. In addition or alternatively, security for the payment/transit app 211 may be enhanced by known alternatives to an SE, such as a TEE (trusted execution environment).

To the extent that the SE includes processing capabilities, it may functionally (though likely not physically) overlap with block 206; to the extent that the SE includes storage (and particularly program storage) capabilities, it may functionally (though likely not physically) overlap with block 208.

In some embodiments, the payment/transit app 211 may be a general purpose payment app that provides access to a payment account system that is accepted by the mass transit system in question. Apart from features provided in accordance with teachings of this disclosure, the payment/transit app in this case need not be specially adapted for obtaining entry to transit systems. Alternatively, the payment/transit app 211 may be specifically modified for use with a particular transit system, in addition to use with conventional purchase transactions in retail stores and the like. In still other embodiments, the payment/transit app 211 may be dedicated to use in connection with a particular mass transit system and may not be usable with merchants generally like a conventional payment app.

As is typical for mobile devices, the mobile device 106 may include mobile communications functions as represented by block 212. The mobile communications functions may include voice and data communications via a mobile communication network with which the mobile device 106 is registered.

In addition, to facilitate use as a payment-enabled device, the mobile device 106 may include short-range radio communications capabilities (block 214), including for example NFC (near field communication). Thus block 214 may represent a suitable antenna (not separately shown) that is appropriate for NFC communications as well as driving and receiving circuitry associated with the antenna. It will be appreciated that the NFC antenna may be separate and different from the antenna (not separately shown) utilized by the mobile device 106 for the mobile communication functions represented by block 212.

Also represented by block 214, and associated with the short-range radio communications capabilities of the mobile device 106, is hardware known as the Contactless Front End (CLF). The CLF may overlap with other aspects of block 214 that have already been mentioned. As will be seen, the CLF may assist in providing functionality to allow the payment-enabled mobile device 106 to detect that it is near a transit system terminal 102, as in a situation as illustrated in FIG. 1. Other aspects of the functionality of the CLF will be described below.

Also shown in FIG. 2 is a biometric sensor 216, which may be one of the components of the payment-enabled mobile device 106. The biometric sensor 216 may be, for example, a fingerprint sensor, and may operate to assist in verifying the user of the device in connection with transactions to be performed at POS terminals in retail stores.

From the foregoing discussion, it will be appreciated that the blocks depicted in FIG. 2 as components of the mobile device 106 may in effect overlap with each other, and/or there may be functional connections among the blocks which are not explicitly shown in the drawing. It may also be assumed that, like a typical smartphone, the mobile device 106 may include a rechargeable battery (not shown) that is contained within the housing 203 and that provides electrical power to the active components of the mobile device 106.

It has been posited that the mobile device 106 may be embodied as a smartphone, but this assumption is not intended to be limiting, as mobile device 106 may alternatively, in at least some cases, be constituted by a tablet computer, smartwatch or by other types of portable electronic devices.

Figure 3:
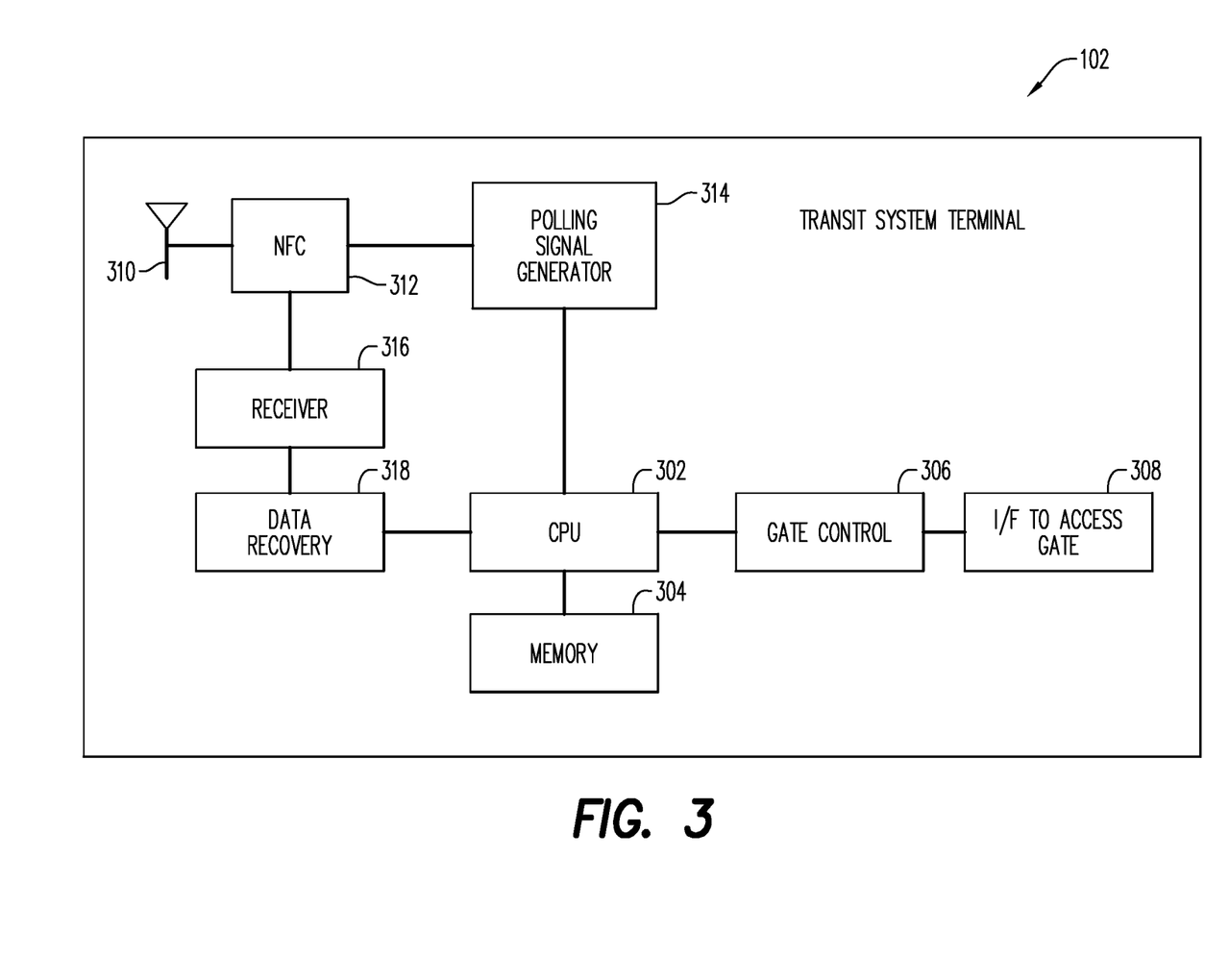
FIG. 3 is a simplified block diagram of a transit system transaction terminal provided in accordance with aspects of the present disclosure to operate in the context shown in FIG. 1.

FIG. 3 is a simplified block diagram of an example embodiment of the transit system terminal 102 shown in FIG. 1.

As seen in FIG. 3, the transit system terminal 102 may include a processor/CPU (central processing unit) 302. The processor 302 may provide overall control of the functioning of the transit system terminal 102. Programming of the processor 302 may determine the functionality of the transit system terminal 102, including features and aspects provided in accordance with teachings of this disclosure.

The transit system terminal 102 may also include one or more memory/storage devices, indicated by reference numeral 304. The memory 304 may be in communication with the processor 302 and may store program instructions that control the processor 302 such that the transit system terminal 102 provides desired functionality as described herein.

The transit system terminal 102 may further include a gate control circuit 306. The gate control circuit 306 may provide signals for controlling opening and closing of the access gate 103 (FIG. 1, not shown in FIG. 3). The transit system terminal 102 may still further include a signal interface 308 for operatively coupling the gate control circuit and its signaling to the access gate 103. The gate control circuit 306, in turn, may be operatively coupled to, and controlled by, the processor 302.

In addition, the transit system terminal 102 may include an antenna 310. The antenna may be operatively coupled to an NFC circuit 312, which transmits polling signals generated by polling signal generator 314 via the antenna 310. The polling signal generator 314 may be operatively coupled to and may operate under the supervision of the processor 302. (Not shown in FIG. 3 is other circuitry that may be present in the transit system terminal 102 to enable the transit system terminal 102 to transmit other signals required for the transit system terminal 102 to engage in interactive exchanges of communications with the mobile device 106 or various types of PICC.)

Still further, the transit system terminal 102 may include a receiver circuit 316 and a data recovery circuit 318. The receiver circuit 316 and the data recovery circuit 318 may operate to receive and recover data from short range data transmissions received at the transit system terminal 102 via the antenna 310 and the NFC circuit 312. It will be appreciated that such data communication may be received from suitably programmed mobile devices and from PICCs. The data recovered from such transmissions may be supplied to the processor 302 via the data recovery circuit 318.

Figure 4:
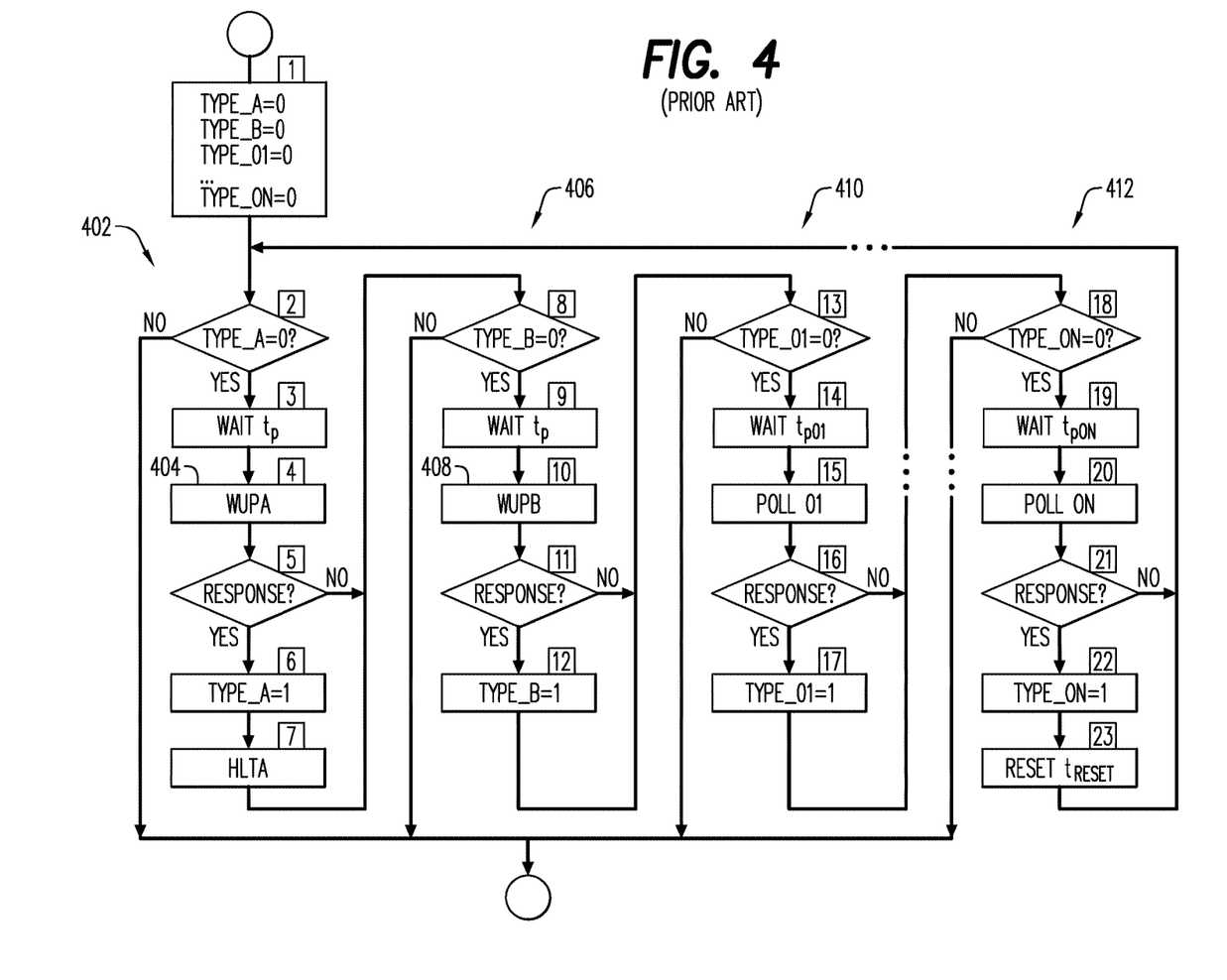
FIG. 4 is a flow diagram that illustrates a conventional standard polling process prescribed for transaction terminals.

FIG. 4 is a flow diagram that illustrates a conventional standard polling process prescribed for transaction terminals. FIG. 4 is presented as background, and for purposes of comparison with FIG. 5, which will be discussed below. FIG. 4 is taken from FIG. 9.2 (page 164) of EMV Contactless Book D (Contactless Communication Protocol v. 2.3), published March 2013 by EMVCo. LLC.

In the first branch 402 of the flow chart shown in FIG. 4, a PCD transmits a Type A polling signal (specifically, a "Wake Up Type A" signal), as indicated at block 404. In the second branch 406 of the flow chart, the PCD transmits a Type B polling signal (specifically, a "Wake Up Type B" signal), as indicated at block 408. (In both cases for these branches 402 and 406, it is assumed that execution of collision detection was not required.) Branches 410 and 412, etc., in FIG. 4 are optional in the sense that they relate to other types of PICC technologies that may or may not be supported by a particular PCD.

The Wake Up Type A and Wake Up Type B polling signals may also be referred to, respectively, as "EMV type A" and "EMV type B" polling signals.

The polling process shown in FIG. 4 may be typical of polling performed by a PCD in a retail environment.

Figure 5:
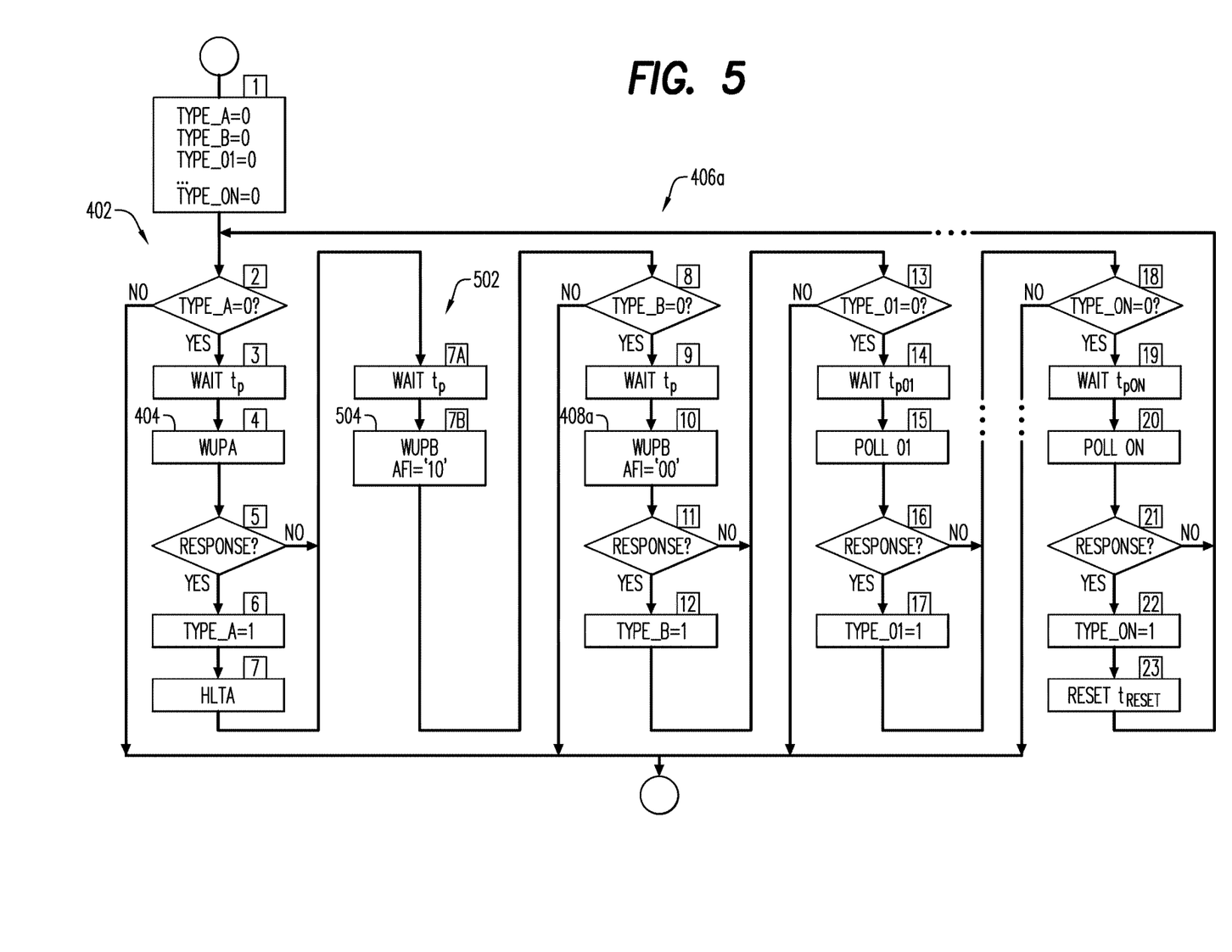
FIG. 5 is a flow diagram that illustrates a modification of the process of FIG. 4 in accordance with aspects of the present disclosure.

FIG. 5 is a flow diagram that illustrates a modified polling process that may be implemented in some embodiments of the transit system terminal 102 in accordance with teachings of the present disclosure.

In the process of FIG. 5, an additional process flow branch 502 is inserted between branch 402 and branch 406a (the latter closely corresponding to branch 406 in FIG. 4). As seen from FIG. 5, particularly at block 504, the branch 502 includes transmission by the transit system terminal 102 of an additional Type B polling signal (i.e., a "Wake Up Type B" signal). In the Type B polling signal of branch 502, block 504, an AFI (Application Family Identifier) value of "10" is included. As is familiar to those who are skilled in the art, this AFI value corresponds to PICCs and the like for use in transit systems.

Further, in this embodiment of the polling process, the Wake Up Type B polling signal included in branch 408a, block 406a, includes an AFI value of "00". As is familiar to those who are skilled in the art, the AFI value "00" is a generic or unspecific AFI value.

With this polling process, the polling signal cycle transmitted from the transit system terminal 102 would include a Type A polling signal, immediately followed by a Type B polling signal (with AFI value="10"), immediately followed by another Type B polling signal (with the latter having an AFI value="00"). Such a polling cycle may prove to be readily indicative to a mobile device that the polling signals originate from a transit system terminal.

Figure 6:
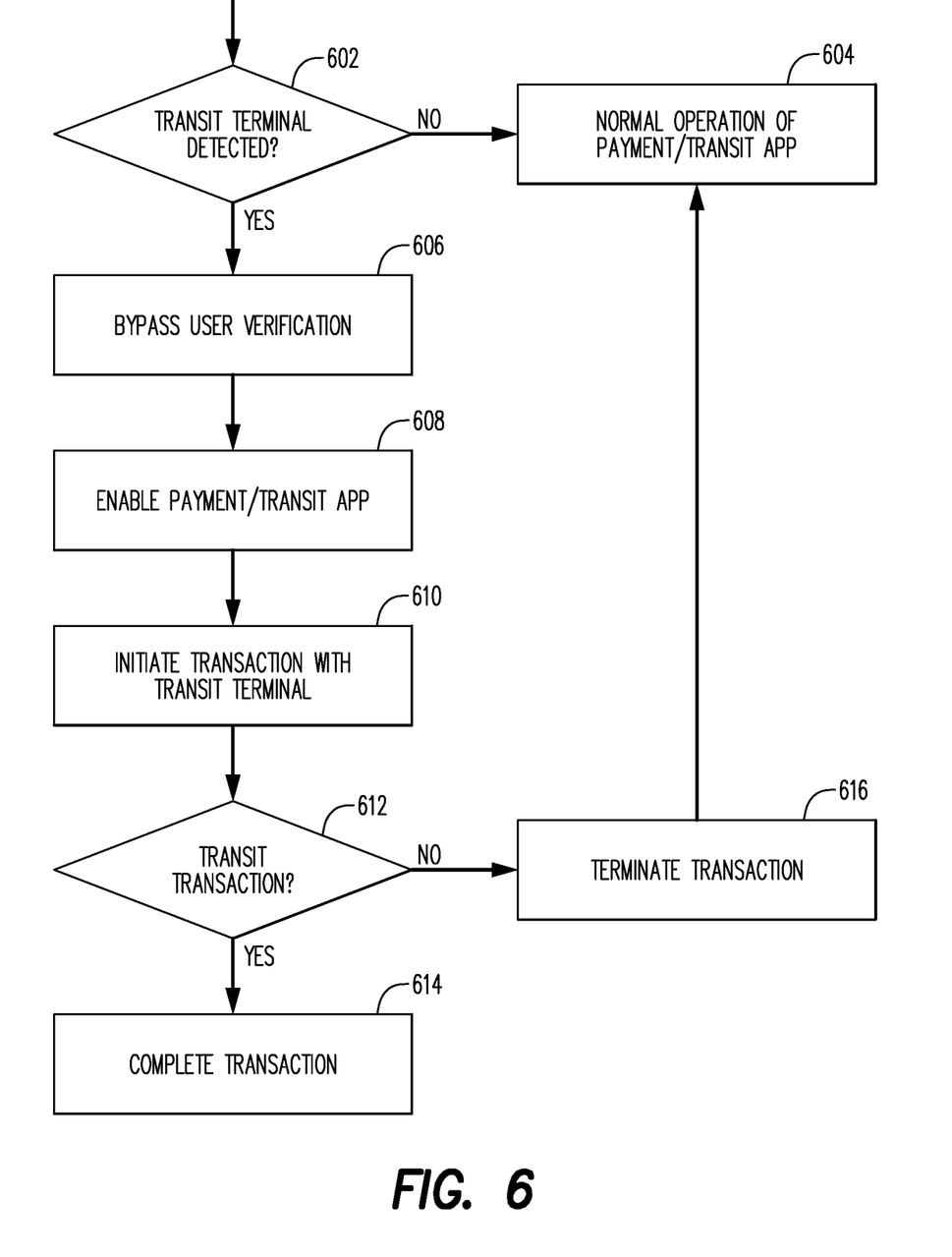
FIG. 6 is a flow diagram that illustrates some of the functionality of the mobile device of FIG. 2 in accordance with aspects of the present disclosure.

FIG. 6 is a flow diagram that illustrates some of the functionality of the mobile device 106 in accordance with aspects of this disclosure.

The process illustrated in FIG. 6 may be performed in and/or by the mobile device 106. The process of FIG. 6 may commence with a decision block 602. At decision block 602 the mobile device 106 may determine whether it has detected a transit system terminal (e.g., the terminal 102 shown in FIG. 1). The mobile device 106 may make this determination based on detecting short-distance radio signals emitted by the transit system terminal in question. By detecting such signals, the mobile device may be said to have detected that it is near to and/or in proximity to a short-range radio enabled terminal.

It is also an aspect of the teachings of the present disclosure that the mobile device not only detects the proximity of the terminal but also determines the type of the terminal, i.e., a transit system terminal versus a POS terminal in a retail store or a payment-enabled gasoline station pump, etc.

The signals emitted by the transit system terminal may be polling signals sent out at frequent intervals to allow the transit system terminal to detect and interact with the supported cards and devices usable for entry into the transit system. The cards/devices may be limited to use with a single transit agency, i.e., a "closed-loop" solution, and communicate via a proprietary protocol or a standard common for transit cards, such as Mifare and FeliCa.

In some embodiments the transit system terminal may be programmed and/or upgraded to additionally support cards/devices issued by a financial institution which follow communication standards defined by EMVCo Contactless Book D, known as EMV cards. In these circumstances, the transit system terminal will support emission of EMV card polling signals between emission of polling signals for closed-loop technology. Such open loop, for example EMV type, polling signals are known in the art as Wake Up A (WUPA) and Wake Up B (WUPB) polling signals.

The polling signals emitted by the transit system terminal 102 may be detected by CLF component 214 to allow the terminal to be identified as a transit system terminal. In at least one embodiment a polling signal of the WUPB type is used with an Application Family Identifier (AFI) that identifies the terminal as a transit terminal between a WUPA polling signal and a standard a WUPB polling signal of a generic non-application specific type. For example, the polling cycle as described above in connection with FIG. 5 may be implemented by the transit system terminal 102 and the CLF may be programmed to detect such a polling cycle. That is, the CLF may detect the transit system terminal 102 by detecting the polling signal sequence Wake Up Type A, Wake Up Type B with AFI=10, Wake Up Type B with AFI=00.

In addition or alternatively, the transit system terminal 102 may emit one or more other types of distinctive signals or sequences of signals from which the CLF can detect the transit system terminal 102.

In other embodiments, a suitable short-range radio beacon (not shown) may be co-located with the transit system terminal 102 to provide a special-purpose signal for detection by the CLF or other component of the mobile device 106 to indicate the proximity of the transit system terminal 102.

As noted above, in at least one embodiment the sequential detection by the mobile device 106 of WUPB polling signals with AFIs of a transit type and generic type is used to determine that a terminal is a transit terminal. It should be noted that the order of the WUPB polling signals can be transit AFI preceding generic AFI or vice-versa.

If a negative determination is made at block 602 (i.e., if the mobile device 106 does not detect the nearness of a transit system terminal), then block 604 may follow decision block 602 in the process of FIG. 6. At block 604, the payment/transit app 211 running in the mobile device 106 may continue to be engaged in its normal modes of operations, including requirements for user verification.

If a positive determination is made at block 602 (i.e., if the mobile device 106 detects the proximity of the transit system terminal 102), then block 606 may follow decision block 602 in the process of FIG. 6. At block 606, the payment/transit app 211 may depart from its usual modes of operation so as to bypass the customary user verification such as fingerprint verification or PIN entry and confirmation. For example, a prevailing requirement for CDCVM (consumer device cardholder verification method) may be bypassed at block 606.

Block 608 may follow block 606. At block 608, the NFC component of the mobile device 106 and the payment/transit app may be enabled to engage in a transaction, including a transaction with a transit system terminal such as the terminal 102 shown in FIG. 1. The transaction to allow the user 104 to enter the transit system may then take place, as indicated at block 610 in FIG. 6. Since the terminal has been detected as being a transit terminal, the transaction may proceed, in some embodiments, using Type A or Type B signaling.

In at least one embodiment, during the transaction (as per decision block 612 in FIG. 6), the mobile device 106/payment app 211 may determine whether the transaction is identified as an EMV transaction for a transit system. This determination may be based on either or both of a transaction amount of zero and a Merchant Category Code (MCC) indicative of the transit system merchant category and/or it may be based upon the detection of the WUPB polling signals with sequential transit and generic AFIs. If a positive determination occurs, then the transaction is completed (block 614). Otherwise, i.e., if the proper conditions for a transit transaction are not found, then the payment/transit app 211 may terminate the transaction (block 616, FIG. 6) and follow on to block 604 in the process of FIG. 6.

With a process like that of FIG. 6 embodied in the mobile device 106, the mobile device may be used to rapidly interact with the transit system terminal so that the user 104 may swiftly enter the transit system via the entry gate controlled by the transit system terminal. Delays that might otherwise occur in or with the mobile device due to user verification activities and processing may be forestalled, and a smooth flow of pedestrian traffic maintained through the entry gate. Thus, embodiments as described herein may function such that a user finds entering a transit system via a payment-enabled mobile device to be equivalent, in terms of user experience, to entry via a contactless IC card. Accordingly, with embodiments as described herein there may be no need for users to prepare the mobile device while approaching the entry gate, nor for the users to remove their gloves to operate the mobile device.

One manner of implementing the decision making at block 602 of FIG. 6 may be as follows. The CLF component 214 of the mobile device 106 may be configured such that it detects a WUPB with AFI=10 between a WUPA poll and a WUPB with AFI=00 poll, as illustrated in FIG. 5, and if detected, the CLF component 214 may trigger the NFC capability and EMV card payment functionality of the payment/transit app 211, with user verification having been by-passed. On detection of a contactless polling, pending detection of WUPB with AFI=10 within the cycle as illustrated in FIG. 5, the CLF may initiate the process to request user activation, according to the customary manner of engaging in, e.g., a retail store purchase transaction (i.e., user verification is required), reverting to by-passing user verification if WUPB with AFI=10 is detected.

In some embodiments, the mobile device 106 may be programmed to provide protections against unauthorized transactions by one or both of the following in lieu of the bypassed user verification: (1) Requiring user consent (but not verification); the user consent may be indicated by, e.g., tapping or double-tapping a hardware or software input on the mobile device or associated peripheral (such as a smartwatch or headset linked to the mobile device), or by causing the orientation of the mobile device to be changed in a pre-determined patterned manner (e.g., pivoting in space back and forth) so as to be detected by gyroscope elements of the mobile device); the indication of user consent may occur just before presenting the mobile device for reading by the transit system terminal; and/or (2) establishment of a counter or counters in the mobile device and/or the payment/transit app to limit the number of times transactions can be performed consecutively with bypassing of user verification; the resetting of the counters may occur upon a successful user verification via the mobile device; the counters may operate in an analogous manner to so-called "lost & stolen" counters.

In some embodiments of the transit system terminal 102, the polling process may include a preliminary section to identify the technology characteristic of the PICC, followed by a secondary polling and selection process once the technology has been identified. In such embodiments, the reader RF field may be reset between the two process sections, and the secondary polling may not include the additional polling branch indicated at 502 in FIG. 5.

Bypassing of user verification may be employed in similar fashion as described in connection with FIG. 6 in various contexts according to various embodiments. For example, the approach of FIG. 6 may be applied with so-called "open loop" systems such as MasterCard, Visa, etc.; and with so-called "closed loop" systems such as M/Chip private label, non-EMV such as Octopus (HK) and Suica (Japan), and ITSO.

Other contexts in which the approach of FIG. 6 may be applied include access control and identification applications, such as hotel access, motor vehicle access, workplace or room access; home access; access to bank branch or ATM enclosure, vehicle charging station; government facility access.

In the context of merchants' customer loyalty accounts, the approach of FIG. 6 may be applied at a contactless terminal that supports loyalty account retrieval prior to initiation of a payment transaction at a point of sale.

The same approach may also be applied in the context of a non-EMV payment transaction. The user device (e.g., a payment-enabled smartphone) may detect that a POS terminal prefers a non-EMV payment communication protocol. In response to detecting this characteristic of the POS terminal, a wallet app on the payment-enabled phone may automatically select a payment app/account that matches the preference of the POS terminal. The transaction may then proceed without CDCVM and with/or without requiring an operator of the POS terminal to provide input to the POS terminal to select the payment communication protocol to be used for the transaction.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

As used herein and in the appended claims, the term "non-retail contactless transaction terminal" refers to a PCD or other contactless terminal that does not engage in charging a monetary amount to a payment account, and/or is not located at a point of sale in a retail store.

With respect to two signals transmitted by a transmitting device, the term "immediately follows", as used herein and in the appended claims, indicates that no signal was transmitted by the transmitting device between transmission of the first one of the transmitted signals and transmission of the second one of the transmitted signals.

The above descriptions and illustrations of processes herein should not be considered to imply a fixed order for performing the process steps. Rather, the process steps may be performed in any order that is practicable, including simultaneous performance of at least some steps.

Although the present invention has been described in connection with specific example embodiments, it should be understood that various changes, substitutions, and alterations apparent to those skilled in the art can be made to the disclosed embodiments without departing from the spirit and scope of the invention as set forth in the appended claims.

What is claimed is:

1. A method of operating a payment-enabled mobile device, the method comprising:
   receiving a polling signal or signals by the mobile device, wherein the received polling signal or signals include standard EMV proximity coupling device (PCD) polling signals;
   detecting, by the mobile device, via said receiving of the polling signal or signals, that the mobile device is in proximity to a non-retail contactless transaction terminal, wherein the detecting step includes detecting two EMV type B PCD polling signals within a single polling cycle of the non-retail contactless terminal, wherein one of the Type B polling signals has an AFI (Application Family Identifier) value that is not "00" and another of the Type B polling signals is an EMV Type B polling signal which has an AFI value of "00", wherein the Type B polling signal having the AFI value that is not "00" immediately precedes the EMV Type B polling signal having the AFI value "00" in a polling cycle of the non-retail contactless transaction terminal; and
   in response to the detected proximity of the non-retail contactless transaction terminal, bypassing a user verification feature of an application program in the mobile device while operating the application program by performing a transaction with the non-retail contactless transaction terminal.

2. The method of claim 1, wherein the transaction results in a user of the payment-enabled mobile device being admitted into a transit system that operates the transit system contactless transaction terminal.

3. The method of claim 2, wherein admission of the user into the transit system occurs via interaction between the transit system contactless transaction terminal and an entrance gate of the transit system.

4. The method of claim 1, wherein the bypassed user verification feature is a fingerprint verification feature.

5. The method of claim 1, wherein the bypassed user verification feature includes entry and verification of a PIN (personal identification number).

6. A payment-enabled mobile device, comprising:
   a processor; and
   a memory in communication with the processor, the memory storing program instructions, the processor operative with the program instructions to perform functions as follows:

receiving a polling signal or signals, wherein the received polling signal or signals include standard EMV proximity coupling device (PCD) polling signals;

detecting, via said receiving of the polling signal or signals, that the mobile device is in proximity to a non-retail contactless transaction terminal, wherein the detecting step includes detecting two EMV type B PCD polling signals within a single polling cycle of the non-retail contactless transaction terminal, wherein one of the Type B polling signals has an AFI (Application Family Identifier) value that is not "00" and another of the Type B polling signals is an EMV Type B polling signal which has an AFI value of "00", wherein the Type B polling signal having the AFI value that is not "00" immediately precedes the EMV Type B polling signal having the AFI value "00" in a polling cycle of the non-retail contactless transaction terminal; and in response to the detected proximity of the non-retail contactless transaction terminal, bypassing a user verification feature of an application program in the mobile device while operating the application program by performing a transaction with the non-retail contactless transaction terminal.

7. The apparatus of claim 6, wherein the non-retail contactless transaction terminal is a transit system contactless transaction terminal.

\* \* \* \* \*